Patented July 7, 1931

1,813,336

UNITED STATES PATENT OFFICE

LEONARD KAY WRIGHT, OF JACKSON HEIGHTS, NEW YORK

REFRIGERANT

No Drawing.    Application filed November 8, 1927.  Serial No. 231,994.

This invention relates to refrigeration, and more particularly has reference to a refrigerant.

The refrigerants heretofore used have had certain disadvantages. Many of them are unstable under working conditions, and over a period of sustained operation have decomposed. Others can be absorbed by only certain materials, and frequently these adsorbents have been difficult and expensive to obtain. Certain of the substances heretofore employed as refrigerants, such as sulphur dioxide, have also had a marked affinity for water and air, and this characteristic of the refrigerants has constituted an objection to their use, for the union of the refrigerant with water or air results in compounds that are injurious to the apparatus.

An object of this invention is to overcome the disadvantages inhering in the refrigerants heretofore employed.

Another object of this invention is to provide a refrigerant that is capable of long and continuous use without deterioration.

A further object of this invention is to provide a refrigerant that is inert on metals and does not unite with water or the atmosphere.

A still further object of this invention is to device a simple and economical refrigerating process.

To accomplish the above and other important objects, as will be obvious, my invention in general comprises the use of a substance as a refrigerant that has a low boiling point and that can, nevertheless, be readily condensed.

I have found that butylene ($C_4H_8$) renders itself as a particularly efficient refrigerant. Three isomers of butylene are possible.

Normal butylene (also known as ethyl ethylene), having the formula $$CH_3.CH_2.CH:CH_2,$$

has a boiling point of $-5°$ C. Beta butylene, or symmetrical dimethylethylene, having the formula $CH_3.CH:CH.CH_3$, has a boiling point of $1°$ C. at 741.4 m. m. pressure. Isobutylene, or unsymmetrical dimethyl ethylene, which has the formula $(CH_3)_2C:CH_2$, has a boiling point of $-6°$ C. This isomer liquefies at from 2 to 2½ atmospheres pressure at a temperature of 15 to 18° C.

Butylene has a high latent heat of vaporization and a relatively low specific heat, which insures a pronounced refrigerating effect per cycle of operation. It is therefore adaptable for various types of refrigeration, whether it is desired to obtain a slight cooling or whether the lower temperatures, such as are sometimes necessary in industrial process, are desired.

Butylene is stable under working conditions, and does not decompose into its constituents when subjected to long and sustained periods of operation. This property makes it eminently fit for use in an adsorption process. It is stable up to very high temperatures, and inasmuch as the refrigerant in an adsorption apparatus is rarely subjected to temperatures in excess of 300° F., while the heats involved in compression apparatus are somewhat lower, there is slight likelihood of my refrigerant decomposing.

Liquefaction of butylene may be obtained at relatively low pressures at ordinary atmospheric temperatures. This is extremely desirable, for it obviates the necessity of constructing the apparatus used of extremely strong material. Many of the refrigerants heretofore used have required extremely expensive apparatus, because of the high pressures to which the apparatus is subjected in the liquefaction of the refrigerant. As my refrigerant is inert on metals, the apparatus may be constructed of iron, steel, copper, bronze, aluminum, or any other metal, or compound, or alloy.

Butylene does not unite with, or break down a lubricating oil, although it does tend to dilute an impure mineral oil. It is insert to castor oil and pure mineral oils, and these, therefore, may be readily substituted for the ordinary lubricating oils employed.

Butylene is extremely soluble in alcohol or ether, and is slightly soluble in water. Alcohol or ether may therefore be used as absorbents in an absorption process. Glaucosil, silica in skeleton form, silica gel, carbon, activated carbon, or any of the other conventional absorbents may be used in the case of an absorption process. These substances are comparatively cheap and easily obtainable.

Butylene has no affinity for water or air, and, therefore, any air, even if it has an aqueous content, that may be sucked into the apparatus, or left in the system before charging with the refrigerant, has no harmful effect on the refrigerant or the system. Some of the refrigerants heretofore used, such as methyl chloride or ethyl chloride, unite with water or air, and the frozen moisture has clogged the valves and obstructed the system. With my refrigerant, any water that is in the apparatus will gravitate to the lowest part of the system, and may there be easily removed.

Butylene has a rather unpleasant odor, and in the event of a leakage in the apparatus, is therefore easily detected. It is non-injurious to health, and the danger in this connection, heretofore present with many of the ordinary refrigerants, is thus removed.

My invention is adapted for use in an extremely simple type of apparatus, although, of course, it may be used in a more intricate machine. In the case of a heat apparatus, a tank containing an adsorbent or absorbent may be provided, to which heat is applied. Upon heating of the adsorbing or absorbing material, the refrigerant is driven off in a gaseous form. As above stated, butylene condenses at a relatively low pressure and high temperature, and a condenser may be provided which is merely air cooled. This is desirable, for it obviates complicated water cooled devices for the condenser.

A storage tank may be provided to hold the liquid until the heating cycle has terminated and the cooling cycle commenced. Upon commencement of the cooling cycle, the refrigerant passes to an evaporator, where the liquid is vaporized. This vaporization of the refrigerant produces the refrigeration. After vaporization the refrigerant in gaseous form passes to the adsorbing tank, where it is adsorbed by the agent provided. This cycle is repeated as frequently as may be necessary to maintain the desired temperature in the refrigerator.

Appropriate valves and regulating devices may be included in the system to govern the rate and cycles of operation.

My refrigerant may also be used, of course, in a compression apparatus of the conventional form, including a compressor, a condenser, a receiver, an expansion valve, an evaporator, and the necessary controls and pipes.

Although my refrigerant is particularly adapted for use in an adsorption or absorption apparatus, its use is not to be limited thereto, nor are the above descriptions of apparatus with which it may be used to be interpreted as constituting limitations, in any wise, of the scope of my invention. And while my invention is particularly adapted for household refrigeration, it is to be clearly understood that its use is not to be limited thereto, for it may be employed wherever artificial refrigeration may be necessary. Where I have used the word "adsorption", it is to be understood that this term embraces "absorption" as well.

It will be observed from the foregoing that I have provided an extremely efficient refrigerant that is capable of long use without decomposition, that is non-corrosive on metals, that has no affinity for water or air, and that may be economically used in a refrigerating apparatus. I wish it to be clearly understood that my invention is to be limited merely by the scope of the appended claims and the showing of the prior art.

I claim as my invention:

1. A refrigerating process comprising adsorbing beta-butylene alone, heating the adsorbent to drive off the refrigerant, condensing the refrigerant so driven off, and reducing the pressure of the condensed refrigerant to cause evaporation.

2. A refrigerating process comprising absorbing beta-butylene in alcohol, heating the absorbent to drive off the refrigerant, condensing the refrigerant so driven off, and reducing the pressure of the condensed refrigerant to cause evaporation.

In testimony whereof I affix my signature.

LEONARD KAY WRIGHT.